United States Patent
Huang et al.

(10) Patent No.: US 7,384,986 B2
(45) Date of Patent: Jun. 10, 2008

(54) PROCESS FOR THE SELECTIVE METHANATION OF CARBONMONOXIDE (CO) CONTAINED IN A HYDROGEN-RICH REFORMATE GAS

(75) Inventors: Chiung-Hui Huang, Hsinchu (TW); Chiou-Hwang Lee, Hsinchu (TW); Ching-Tang Lin, Hsinchu (TW)

(73) Assignee: Industrial Technology Research Institute, Hsinchu (TW)

( * ) Notice: Subject to any disclaimer, the term of this patent is extended or adjusted under 35 U.S.C. 154(b) by 323 days.

(21) Appl. No.: 11/110,732

(22) Filed: Apr. 21, 2005

(65) Prior Publication Data

US 2006/0111456 A1 May 25, 2006

(30) Foreign Application Priority Data

Nov. 19, 2004 (TW) .............................. 93135724 A

(51) Int. Cl.
C07C 27/06 (2006.01)
B01J 23/42 (2006.01)

(52) U.S. Cl. .................. 518/715; 423/247; 502/339

(58) Field of Classification Search ............... 518/715; 423/247

See application file for complete search history.

(56) References Cited

U.S. PATENT DOCUMENTS

| | | | | |
|---|---|---|---|---|
| 3,663,162 A * | 5/1972 | Randhava | .................. | 423/247 |
| 3,787,468 A * | 1/1974 | Fleming et al. | ............. | 518/714 |
| 3,884,838 A * | 5/1975 | Fleming et al. | ............. | 502/313 |
| 4,605,680 A * | 8/1986 | Beuther et al. | ............. | 518/715 |
| 5,023,277 A * | 6/1991 | McAteer | ..................... | 518/715 |
| 6,475,454 B1 * | 11/2002 | Cole et al. | ................... | 423/246 |
| 6,673,327 B1 * | 1/2004 | Bakker et al. | ............. | 423/247 |
| 6,726,890 B1 * | 4/2004 | Watanabe | ................... | 423/247 |
| 6,753,351 B2 * | 6/2004 | Clark et al. | ................ | 518/700 |
| 6,780,386 B1 * | 8/2004 | Fukunaga et al. | .......... | 423/247 |
| 6,977,273 B2 * | 12/2005 | Roy-Auberger et al. | .... | 518/715 |
| 7,071,239 B2 * | 7/2006 | Ortego et al. | ............... | 518/715 |
| 7,241,815 B2 * | 7/2007 | Roy-Auberger et al. | .... | 518/715 |
| 2002/0028853 A1 * | 3/2002 | Manzer et al. | ............. | 518/713 |
| 2003/0059360 A1 * | 3/2003 | Hoshino et al. | ............ | 423/247 |
| 2003/0187294 A1 * | 10/2003 | Hagemeyer et al. | ....... | 560/241 |
| 2007/0098615 A1 * | 5/2007 | Echigo et al. | .............. | 423/247 |

* cited by examiner

Primary Examiner—Wayne A. Langel
(74) Attorney, Agent, or Firm—Bacon & Thomas PLLC

(57) ABSTRACT

The present invention provides a methanation catalyst prepared by depositing Pt and Ru on a metal oxide carrier by incipient wetness impregnation or precipitation deposition, drying and calcining the deposited carrier to obtain a Pt—Ru/metal oxide catalyst. This catalyst can selectively catalyze methanation of CO, wherein hydrogen and CO in a hydrogen-rich reformate or synthesis gas are reacted to form methane and water, thereby the CO concentration in the hydrogen-rich reformate is reduced.

20 Claims, 3 Drawing Sheets

PROCESS FOR THE SELECTIVE METHANATION OF CARBONMONOXIDE (CO) CONTAINED IN A HYDROGEN-RICH REFORMATE GAS

FIELD OF THE INVENTION

The present invention relates to a catalyst for selective methanation of CO contained in a hydrogen-rich reformate gas, wherein the resulting hydrogen-rich reformate gas with a reduced CO concentration can be used as a fuel for a fuel cell.

BACKGROUND OF THE INVENTION

A polymer electrolyte fuel cell (PEFC) is highly possible to be applied as a stationary domestic power generation system or in an electric car, and a PEFC system requiring a fuel consisting of a hydrogen-rich gas (concentration of $H_2>35\%$) with a CO concentration lower than 20 ppm. A hydrogen-rich reformate gas formed from a reforming reaction of hydrocarbon contains about 4~15% of CO, which needs to undergo a water-gas shift (WGS) reaction to reduce the CO content to less than 1% of, followed by a preferential oxidation reaction or a methanation reaction and a preferential oxidation reaction in serial in order to reduce the CO concentration to be less than 100 ppm, or even less than 20 ppm. By selecting a suitable catalyst and controlling the reaction at a suitable temperature, the CO contained in a hydrogen-rich reformate gas can be converted to methane through the methanation reaction, and thus reduce the CO concentration therein. One advantage of the methanation reaction is the reactor design is simpler than that for use in the PrOX reaction. However, one defect of the methanation reaction is removing one mole of CO requiring depleting three moles of hydrogen. Thus, methanation mainly is applied on a reformate gas with a low CO concentration or for miniaturization of a fuel reformer. At present, methanation has been used in the design of reformers by the Osaka Gas Company and the Mercedes-Benz Automobile Company.

However, other than catalyzing a CO methanation reaction, a methanation catalyst will also catalyze a $CO_2$ methanation reaction. In order to taking into account of both CO removal and hydrogen loss, a good methanation catalyst should have good catalytic activity and reaction selectivity to the CO methanation reaction.

$CO+3H_2 \rightarrow CH_4+H_2O$ $CO_2+4H_2 \rightarrow CH_4+2H_2O$ (side reaction)

An active metal used in the methanation reaction catalyst for the conventional petrochemical industry mostly is nickel. A nickel-catalyzed methanation reaction has a slightly higher reaction temperature of about 400° C. When the reactant composition contains $CO_2$, a nickel catalyst at 400° C. is liable to catalyze a $CO_2$ methanation reaction, which will consume a larger amount of hydrogen and can not be used in serial to an existing WGS reaction. Other than a nickel catalyst, ruthenium is most commonly used as an active metal in a methanation catalyst.

U.S. Pat. No. 3,787,468 discloses a mixed Ru—$WO_X$ and Pt—Ru—$WO_X$ catalyst, which are applicable on methanation of CO and $CO_2$, wherein Ru—$WO_X$ has a better methanation activity, and Pt—Ru—$WO_X$ has a lower activity. Said catalysts contain Ru as a main ingredient, Pt in an amount of 0-50% of the amount of Ru, and $WO_X$ in an amount of 5-20% of Ru. That is said catalysts contain a high content of precious metal, which leads to a high production cost.

U.S. Pat. No. 3,615,164 discloses a Ru or Rh catalyst suitable for selective methanation of CO, wherein said Ru or Rh is supported on a metal oxide carrier.

In comparison with a nickel catalyst, a ruthenium catalyst has a lower reaction temperature in catalyzing a methanation reaction. However, the reaction temperature thereof is deeply influenced by a space velocity. Even though a ruthenium catalyst has the advantages of a high activity in catalyzing a CO methanation reaction and a low reaction temperature (U.S. Pat. No. 3,615,164; U.S. Pat. No. 3,787,468), ruthenium is liable to form a $Ru(CO)_x$ complex with CO, whereas the $Ru(CO)_x$ complex will sublimate in the methanation reaction, causing deterioration of the catalyst activity, thereby affecting the lifespan of the catalyst.

SUMMARY OF THE INVENTION

A primary objective of the present invention is to provide a catalyst free from the defect of a poor operational lifespan of the conventional ruthenium catalyst, and having high activity and high selectivity in catalyzing the CO methanation reaction, thereby reducing the hydrogen loss in the hydrogen-rich reformate gas.

In order to achieve the above-mentioned objective, the present invention uses a Ru/metal oxide catalyst in combination with an active metal, Pt, creating an alloy or mixture of Pt and Ru to weaken the power of Ru to combine CO in forming the $Ru(CO)_x$ complex. Meanwhile, the catalytic activity and selectivity to the CO methanation reaction of the Pt—Ru/metal oxide catalyst of the present are comparative or enhanced in comparison with the conventional Ru/metal oxide catalyst.

DETAILED DESCRIPTION OF THE INVENTION

Figure 1:
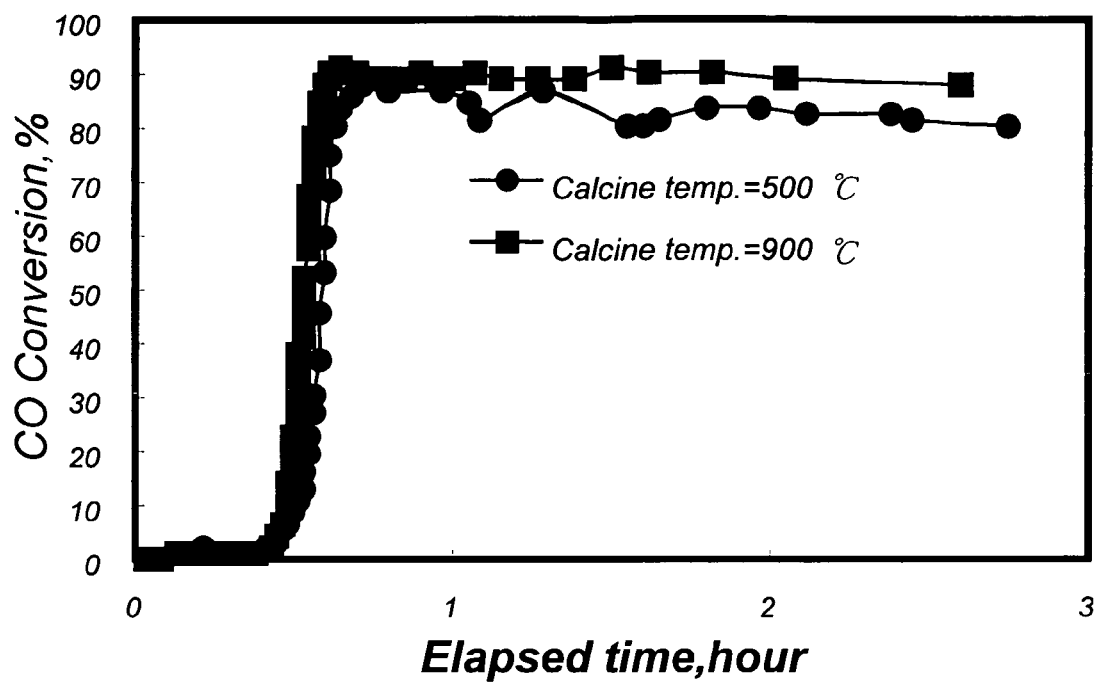
FIG. 1 shows the CO conversion ratio in a methanation reaction vs. the reaction time, wherein the black circles indicate the performance of the catalyst in Example 1 of the present invention, and the black square dots indicate the performance of the catalyst in Example 2 of the present invention.

The present invention discloses a method for converting CO and hydrogen into methane and water, which comprises: contacting a mixture gas of CO, hydrogen, steam and CO$_2$, with a Pt—Ru/metal oxide catalyst at 150~500° C., preferably at 200~350° C.

A mixture gas suitable for the present invention is preferably contains 0.1~2% of CO, preferably less than 1% of CO.

Preferably, the concentration of CO$_2$ in said mixture gas is higher than the concentration of CO.

A source of said mixture gas source is a hydrogen-rich reformate gas from a hydrocarbon reforming reaction.

A Pt—Ru/metal oxide catalyst according to the present invention includes 0.1~5% of Pt and 0.1~5% of Ru supported on a metal oxide carrier, based on the weight of the metal oxide carrier.

Said metal oxide carrier is selected from the group consisting of alumina, cerium dioxide, zirconium oxide, or a mixture oxide thereof.

Preferably, said catalyst includes 0.5~2% of platinum (Pt) and 1~4% of ruthenium (Ru), based on the weight of the metal oxide carrier.

Preferably, a mole ratio of Pt and Ru in said catalyst is 0.1~10, preferably 0.3~3.

A suitable process for preparing the Pt—Ru/metal oxide catalyst of the present invention comprises the following steps:

a) impregnating a metal oxide in an aqueous solution containing Pt ions and Ru ions having an amount so that said mixture oxide is subjected to an incipient wetness impregnation; and b) heating the resulting impregnated mixture oxide from step a) so that substantially only Pt and Ru ions in said aqueous solution are deposited on said metal oxide.

Preferably, the amount of said aqueous solution in step a) enables said metal oxide to be impregnated with 0.1-5.0% of Pt ions and 0.1-5.0% of Ru ions, based on the weight of said metal oxide.

Said incipient wetness impregnation comprises measuring the moisture content (ml/g) of said metal oxide prior to said impregnating, and preparing a suitable volume of an aqueous solution of Pt metal salt and Ru metal salt. While under mixing, said aqueous solution is dripped into said metal oxide in a container, which is immediately absorbed by said carrier. Upon completion of addition of all aqueous solution, said metal oxide is still in the form of a powder but with slightly wetted surfaces.

Preferably, said heating in step b) comprises drying said incipient wetness impregnated metal oxide at 100-150° C., and calcining said dried metal oxide at 400-1000° C., preferably at 800-950° C.

Another suitable process for preparing the Pt—Ru/metal oxide catalyst of the present invention comprises the following steps:

A) immersing a metal oxide in an aqueous solution containing Pt ions and Ru ions;

B) adjusting pH value of said aqueous solution so that Pt ions and Ru ions are adsorbed on surfaces of said metal oxide, and adding a precipitation agent into said aqueous solution for precipitation of Pt ions and Ru ions on said metal oxide in a metal form;

C) separating the mixture obtained in step B) by filtration in order to obtain a metal oxide precipitated with Pt metal and Ru metal; and D) heating said metal oxide precipitated with Pt metal and Ru metal.

Preferably, the precipitation agent in step B) is selected from hydrazine or formaldehyde.

Preferably, the amount of said aqueous solution in step A) enables said metal oxide to be precipitated with 0.1-5.0% of Pt and 0.1-5.0% of Ru, based on the weight of said metal oxide.

Preferably, said heating in step D) comprises drying said metal oxide precipitated with Pt metal and Ru metal at 100-150° C., and calcining said dried metal oxide at 400-1000° C., more preferably at 800-950° C.

The present invention will be further elaborated through the following examples, which are for illustrative purpose only and not for limiting the scope of the present invention, which is defined in the following claims.

EXAMPLE 1

30 g of Al$_2$O$_3$ granules with a diameter of 3~5 mm was mixed with an aqueous solution of Ru(NO$_3$)$_3$ (50 g/L, 6.1 ml) containing 0.306 g of Ru, and an aqueous solution of Pt(NO$_2$)$_2$(NH$_3$)$_2$ (50 g/L, 5.9 ml) containing 0.294 g of Pt. The resulting mixture was diluted with deionized water to 110 ml, and adjusted to a pH value of 9~10 by the addition of sodium hydroxide in order for the Pt and Ru ions to be adsorbed onto the Al$_2$O$_3$ carrier, followed by adding a suitable amount (1.2 g) of hydrazine. The resulting mixture was stirred continuously for 2 hours, followed by filtration to obtain a Pt- and Ru-containing Al$_2$O$_3$ powder. Said Al$_2$O$_3$ carrier containing Pt and Ru was dried (120° C., 4 hours) and calcined (500° C., 2 hours), thereby obtaining a Pt—Ru/Al$_2$O$_3$ catalyst, which contains 0.98 wt % of Pt and 1.02 wt % of Ru, based on the weight of Al$_2$O$_3$, and has an atomic ratio of Pt and Ru of 1:2.

EXAMPLE 2

The procedures in Example 1 were repeated to prepare a Pt—Ru/Al$_2$O$_3$ catalyst except that the calcining temperature was changed from 500° C. to 900° C., which contains 0.98 wt % of Pt and 1.02 wt % of Ru, based on the weight of Al$_2$O$_3$, and an atomic ratio of Pt and Ru of 1:2.

A conventional fixed-bed reaction system was used to test the activity and selectivity of the catalysts in a methanation reaction. 12.6 ml of the Pt—Ru/Al$_2$O$_3$ catalysts with a diameter of 3~5 mm from Example 1 and 2 were separately loaded in a quartz reaction tube with an inside diameter of 2.2 cm. An electric heating furnace was used to control the inlet temperature of a reaction mixture gas to be at 250° C. Said reaction mixture gas contained 50 vol % of H$_2$, 1 vol % of CO, 18 vol % of CO$_2$, 16.5 vol % of H$_2$O, and the balance of nitrogen. The flow rate of the reaction mixture gas was 1000 ml/min (the space velocity, GHSV, being 4700 hour$^{-1}$).

The CO conversion ratio (%) is defined as follows:

([concentration of CO in the reaction mixture gas]–[concentration of CO in the product gas])/[concentration of CO in the reaction mixture gas]× 100%

FIG. 1 shows the relationship of the conversion ratio of CO in the methanation reaction vs. the reaction time, wherein the black circles represent the performance of the catalyst in Example 1 and the black square dots represent the performance of the catalyst in Example 2. The experimental data in FIG. 1 clearly indicate that the CO conversion ratio of the Pt—Ru/$Al_2O_3$ catalyst in a methanation reaction is increased when the calcination temperature is increased from 500° C. to 900° C.

Figure 2:
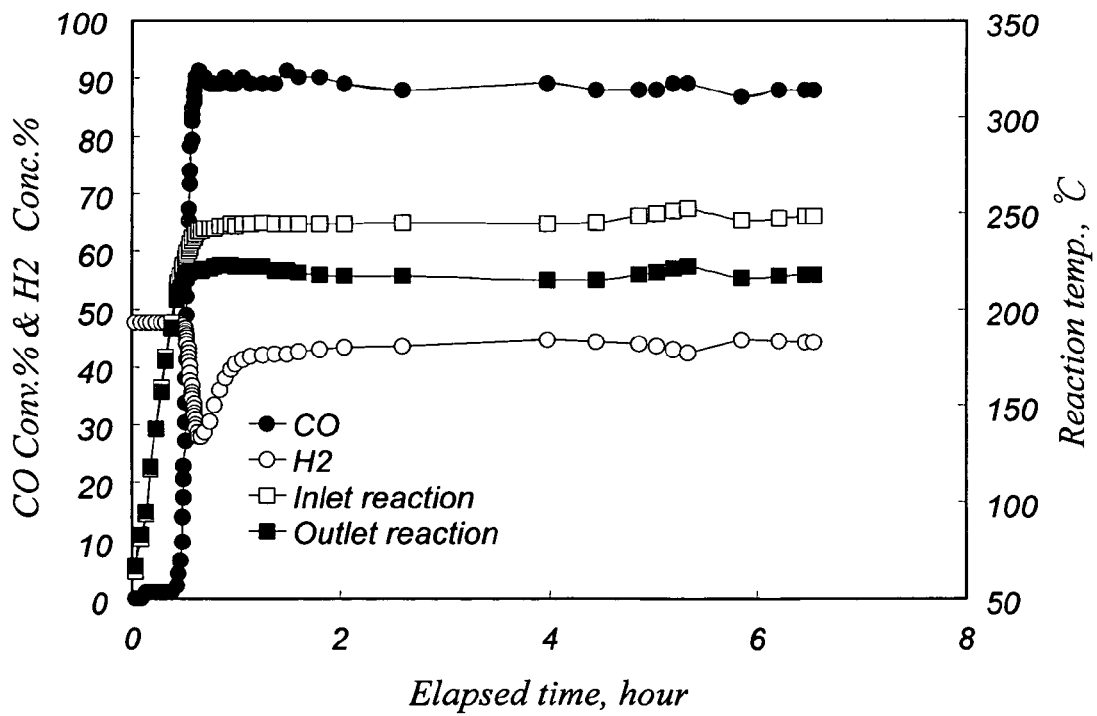
FIG. 2 shows the CO conversion ratio and the hydrogen concentration in the product from a methanation reaction using a catalyst in Example 2 of the present invention vs. the reaction time, wherein the black circles indicate the CO conversion ratio, the hollow circles indicate the hydrogen concentration in the product, the hollow square dots indicate the inlet temperature of the reaction mixture gas, and the black square dots indicate the outlet temperature of the product gas.

FIG. 2 shows the relationship of the conversion ratio of CO and the hydrogen concentration in the product gas in the methanation reaction vs. the reaction time for the catalyst in Example 2, wherein the black circles represent the CO conversion ratio, the hollow circles represent the hydrogen concentration in the product gas, the hollow square dots represent the inlet temperature of the reaction mixture gas, and the black square dots represent the outlet temperature of the product gas. The hydrogen concentration data in FIG. 2 show that the Pt—Ru/$Al_2O_3$ catalyst in Example 2 has a high activity in the CO methanation reaction and a low activity in the $CO_2$ methanation reaction.

Figure 3:
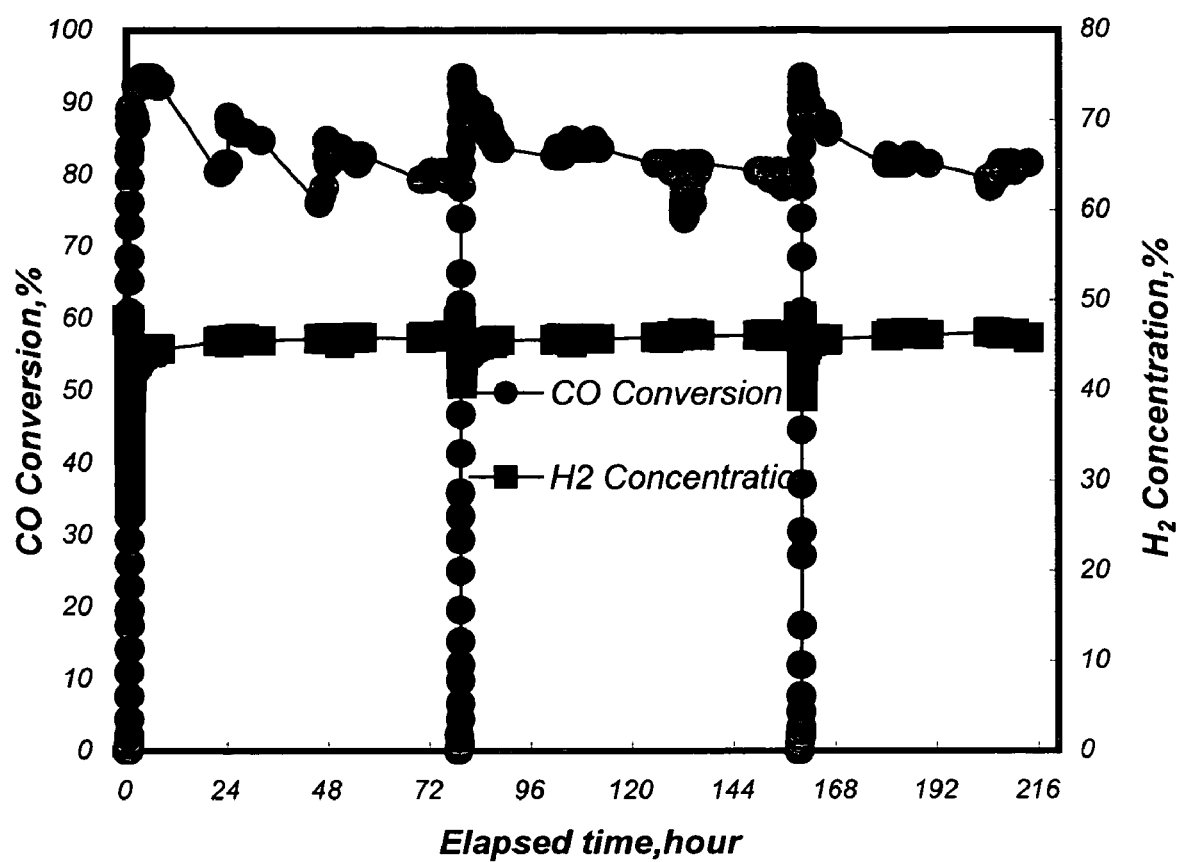
FIG. 3 shows the experimental results of a Pt—Ru/$Al_2O_3$ catalyst in Example 2 of the present invention in a CO methanation reaction, wherein air was introduced for cooling the catalyst after the reaction had been carried out for about 72 hours, before the CO methanation reaction was resumed, wherein the black circles indicate the CO conversion ratio, and the black square dots indicate the hydrogen concentration in the product gas.

The Pt—Ru/$Al_2O_3$ catalyst in Example 2 was used in the fixed-bed CO methanation reaction using the same reaction mixture gas for about 72 hours, air was introduced to cool the catalyst, and then the CO methanation reaction was resumed. The results are shown in FIG. 3. It can be seen from FIG. 3 that the performance of said Pt—Ru/$Al_2O_3$ catalyst in the CO methanation reaction is not altered after the 72-hour of reaction and the air contact.

CONTROL EXAMPLE 1

30 g of a $ZrO_2$ powder was mixed with a $Ru(NO_3)_3$ solution (50 g/L 6.0 ml) containing 0.3 g of ruthenium. The resulting mixture was diluted to 100 ml, and adjusted to a pH value of 9~10 by the addition of sodium hydroxide in order for Ru to be adsorbed onto the $ZrO_2$ carrier. Next, a suitable amount (1 g) of hydrazine was added, and the resulting mixture was stirred continuously for 2 hours, and then filtered to obtain a Ru-containing $ZrO_2$ powder, which was then dried (120° C., 4 hours) and calcined (500° C., 2 hours), thereby obtaining a Ru/$ZrO_2$ catalyst containing 1 wt % of Ru, based on the weight of the $ZrO_2$ carrier.

The Ru/$ZrO_2$ catalyst powder so prepared was added with 10 wt % of an alumina sol-gel and water to form a slurry, which was then coated on a ceramic honeycomb carrier with 400 cells/$in^2$, a diameter of 2 cm, and a length of 4 cm, and then dried at 120° C. for 24 hours, and calcined at 500° C. for 2 hours.

EXAMPLE 3

30 g of a $ZrO_2$ powder was mixed with a $Ru(NO_3)_3$ solution (50 g/L, 6.0 ml) containing 0.306 g of ruthenium, and an aqueous solution of $Pt(NO_2)_2(NH_3)_2$ (50 g/L, 5.9 ml) containing 0.294 g of Pt. The resulting mixture was diluted to 110 ml, and adjusted to a pH value of 9~10 by the addition of sodium hydroxide in order for Pt and Ru to be adsorbed onto the $ZrO_2$ carrier. Next, a suitable amount (1.2 g) of hydrazine was added, and the resulting mixture was stirred continuously for 2 hours, and then filtered to obtain a Pt- and Ru-containing $ZrO_2$ powder, which was then dried (120° C., 4 hours) and calcined (500° C., 2 hours), thereby obtaining a Pt—Ru/$ZrO_2$ catalyst containing 0.98 wt % of Pt and 1.02 wt % of Ru, based on the weight of the $ZrO_2$ carrier, wherein the atomic ratio of Pt and Ru was 1:2.

The Pt—Ru/$ZrO_2$ catalyst powder so prepared was added with 10 wt % of an alumina sol-gel and water to form a slurry, which was then coated on a ceramic honeycomb carrier with 400 cells/$in^2$, a diameter of 2 cm, and a length of 4 cm, and then dried at 120° C. for 24 hours, and calcined at 500° C. for 2 hours.

A conventional fixed-bed reaction system was used to test the activity of the catalysts prepared in Control Example 1 and Example 3 of the present invention in a methanation reaction. The honeycomb catalysts were separately mounted in a quartz reaction tube with an inside diameter of 2.2 cm. An electric heating furnace was used to control the inlet temperature of the reaction mixture gas. The reaction mixture gas contained 50 vol % of $H_2$, 2 vol % of CO, 18 vol % of $CO_2$, 12 vol % of $H_2O$, and the balance of nitrogen. The flow rate of the reaction mixture gas was 938 ml/min.

Figure 4:
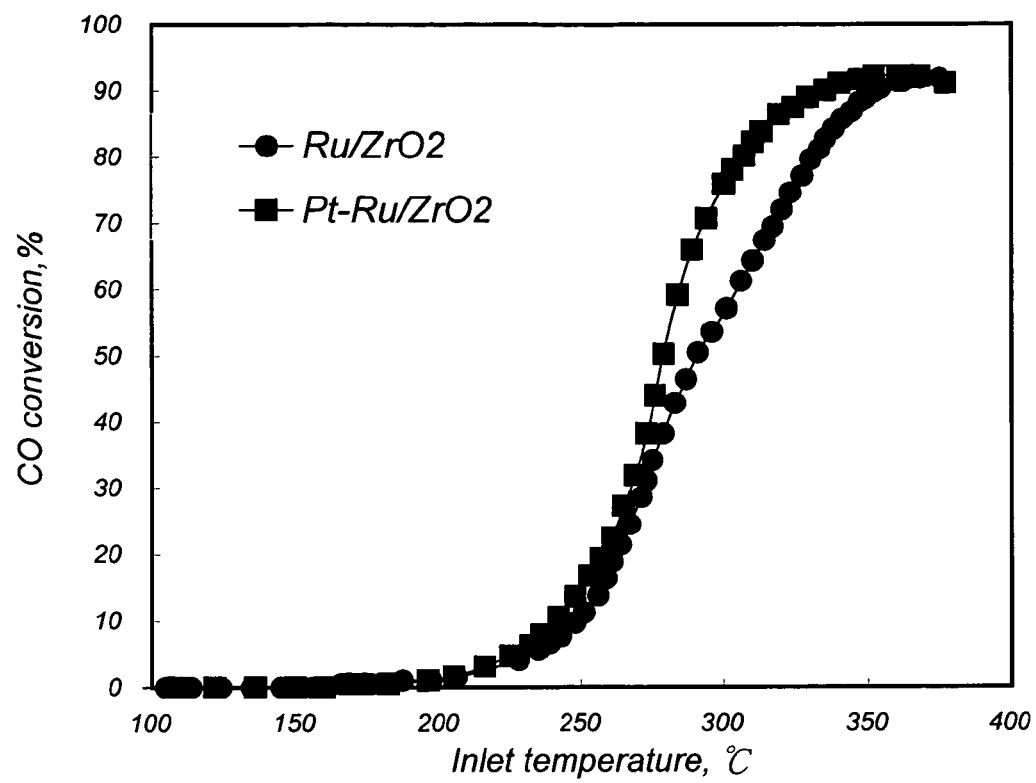
FIG. 4 shows the CO conversion ratio of a Ru/$ZrO_2$ catalyst in Control Example 1 (circles) and a Pt—Ru/$ZrO_2$ catalyst in Example 3 of the present invention (square dots) in a methanation reaction vs. the inlet temperature of the reaction mixture gas.

FIG. 4 show the CO conversion ratio in a methanation reaction vs. the inlet temperature of the reaction mixture gas, wherein the black circles represent the performance of the catalyst in Control Example 1 and the black square dots represent the performance of the catalyst in Example 3 of the present invention. It can be seen from FIG. 4 that the addition of Pt will improve the performance of a Ru/$ZrO_2$ catalyst in a CO methanation reaction, wherein the CO conversion ratio of the Ru/$ZrO_2$ catalyst at 300° C. was about 57%, and 76% for the Pt—Ru/$ZrO_2$ catalyst.

EXAMPLE 4

The procedures in Example 3 were repeated to prepare a ceramic honeycomb Pt—Ru/$Al_2O_3$ catalyst, except that 30 g of $Al_2O_3$ powder was used to replace 30 g of $ZrO_2$ powder, wherein the concentrations of Pt and Ru were respectively 0.98 wt % and 1.02 wt %, based on the weight of $Al_2O_3$, and the atomic ratio of Pt and Ru was 1:2.

A conventional fixed-bed reaction system was used to test the activity of the catalysts prepared in Examples 3 and 4 of the present invention in a methanation reaction. The honeycomb catalysts were separately mounted in a quartz reaction tube with an inside diameter of 2.2 cm. An electric heating furnace was used to control the inlet temperature of the reaction mixture gas. The reaction mixture gas contained 50 vol % of $H_2$, 2 vol % of CO, 18 vol % of $CO_2$, 12 vol % of $H_2O$, and the balance of nitrogen. The flow rate of the reaction mixture gas was 938 ml/min.

Figure 5:
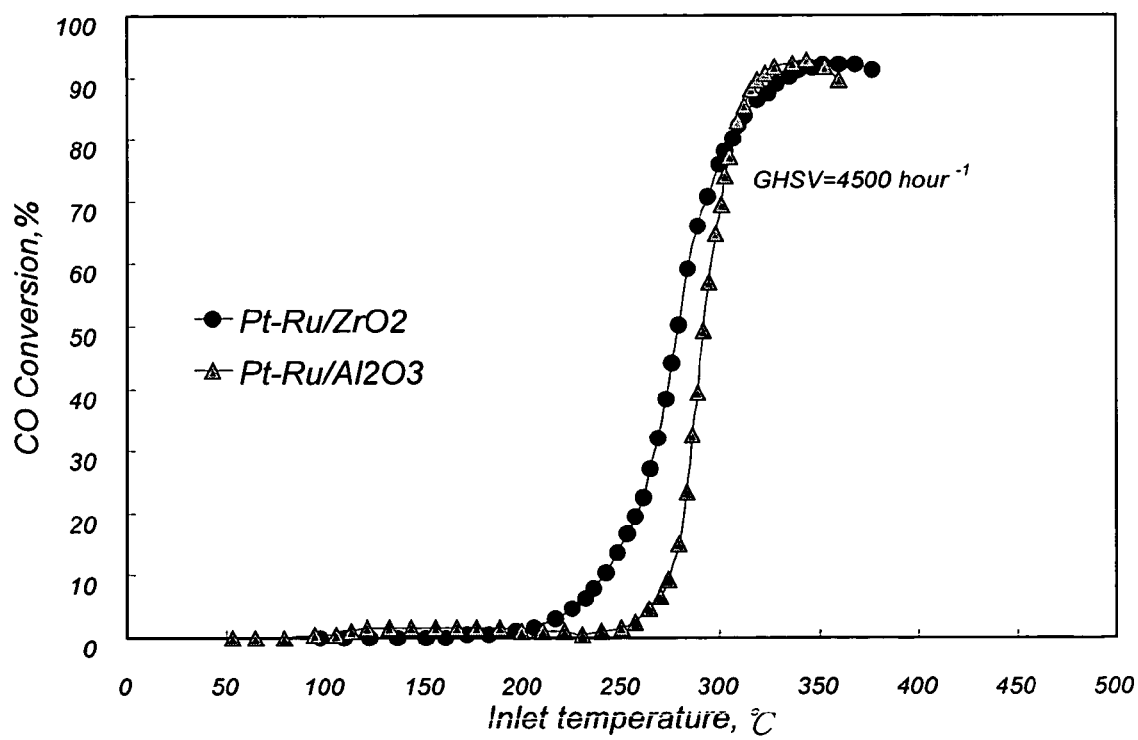
FIG. 5 shows the CO conversion ratio of a Pt—Ru/ZrO$_2$ catalyst in Example 3 (circles) and a Pt—Ru/Al$_2$O$_3$ catalyst in Example 4 (triangular dots) of the present invention in a methanation reaction vs. the inlet temperature of the reaction mixture gas.

FIG. 5 shows the CO conversion ratio in a methanation reaction vs. the inlet temperature of the reaction mixture gas, wherein the circles represent the performance of the catalyst in Example 3 and the triangular dots represent the performance of the catalyst in Example 4. The experimental data in FIG. 5 clearly indicate that the Pt—Ru/$ZrO_2$ catalyst and the Pt—Ru/$Al_2O_3$ catalyst substantially have the same reaction activity in the CO methanation reaction at 300° C.

The present invention had been described in the above. Any person skilled in the art still could provide various variations and modifications to the present invention without departure from the scope of the present invention as defined in the following claims.

The invention claimed is:

1. A method for converting CO and hydrogen into methane and water, which comprises: contacting a gas mixture comprising CO, hydrogen, steam and $CO_2$ with a Pt—Ru/metal oxide catalyst at 150~500° C. to convert CO and hydrogen into methane and water as major products, wherein said Pt—Ru/metal oxide catalyst comprises a metal oxide carrier, Pt and Ru which are supported on the metal oxide carrier as a major portion of metals supported on the metal oxide, wherein 0.1~5% of Pt and 0.1~5% of Ru are supported on the metal oxide carrier, based on the weight of the metal oxide carrier.

2. The method as claimed in claim 1, wherein said contact is carried out at 200~350° C.

3. The method as claimed in claim 1, wherein said gas mixture comprises 0.1~2% of CO, based on the volume of said gas mixture.

4. The method as claimed in claim 3, wherein said gas mixture comprises less than 1% of CO, based on the volume of said gas mixture.

5. The method as claimed in claim 3, wherein a concentration of said $CO_2$ in said gas mixture is higher than a concentration of said CO in said gas mixture.

6. The method as claimed in claim 1, wherein said metal oxide carrier is selected from the group consisting of alumina, cerium dioxide, zirconium oxide, and a mixture oxide thereof.

7. The method as claimed in claim 1, wherein said catalyst comprises 0.5~2% of platinum and 1~4% of ruthenium, based on the weight of the metal oxide carrier.

8. The method as claimed in claim 1, wherein a mole ratio of Pt and Ru in said catalyst is 0.1~10.

9. The method as claimed in claim 8, wherein a mole ratio of Pt and Ru in said catalyst is 0.3~3.

10. The method as claimed in claim 1, wherein said catalyst is prepared by a process comprising the following steps:
    a) impregnating a metal oxide in an aqueous solution containing Pt ions and Ru ions having an amount so that said mixture oxide is subjected to an incipient wetness impregnation; and
    b) heating the resulting impregnated mixture oxide from step a) so that substantially only Pt and Ru ions in said aqueous solution are deposited on said metal oxide.

11. The method as claimed in claim 10, wherein said amount of said aqueous solution in step a) enables said metal oxide to be impregnated with 0.1~5.0% of Pt ions and 0.1~5.0% of Ru ions, based on the weight of said metal oxide.

12. The method as claimed in claim 10, wherein said heating in step b) comprises drying said incipient wetness impregnated metal oxide at 100-150° C, and calcining said dried metal oxide at 400-1000° C.

13. The method as claimed in claim 12, wherein said calcining is carried out at 800-950° C.

14. The method as claimed in claim 1, wherein said catalyst is prepared by a process comprising the following steps:
    A) immersing a metal oxide in an aqueous solution containing Pt ions and Ru ions;
    B) adjusting pH value of said aqueous solution so that Pt ions and Ru ions are adsorbed on surfaces of said metal oxide, and adding a precipitation agent into said aqueous solution for precipitation of Pt ions and Ru ions on said metal oxide in a metal form;
    C) separating the mixture obtained in step B) by filtration in order to obtain a metal oxide precipitated with Pt metal and Ru metal; and
    D) heating said metal oxide precipitated with Pt metal and Ru metal.

15. The method as claimed in claim 14, wherein said precipitation agent in step B) is hydrazine or formaldehyde.

16. The method as claimed in claim 14, wherein the amount of said aqueous solution in step A) enables said metal oxide to be precipitated with 0.1-5.0% of Pt and 0.1-5.0% of Ru, based on the weight of said metal oxide.

17. The method as claimed in claim 14, wherein said heating in step D) comprises drying said metal oxide precipitated with Pt metal and Ru metal at 100-150° C., and calcining said dried metal oxide at 400-100° C.

18. The method as claimed in claim 17, wherein said calcining is carried out at 800-950° C.

19. The method as claimed in claim 1, wherein said Pt—Ru/metal oxide catalyst consists essentially of Pt, Ru and the metal oxide carrier.

20. The method as claimed in claim 1, wherein said Pt—Ru/metal oxide catalyst does not contain a Group VIII metal as a major portion of metals supported on the metal oxide.

* * * * *